Figure 1:
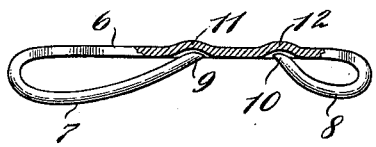

S. WEATHERLEY.
PIN.
APPLICATION FILED JAN. 21, 1914.

1,142,547.

Patented June 8, 1915.

Witnesses:

Stuart Weatherley, Inventor
By his Attorney Lewis J. Doolittle

UNITED STATES PATENT OFFICE.

STUART WEATHERLEY, OF LONDON, ENGLAND.

PIN.

1,142,547.  Specification of Letters Patent. Patented June 8, 1915.

Application filed January 21, 1914. Serial No. 813,401.

*To all whom it may concern:*

Be it known that I, STUART WEATHERLEY, a subject of the King of England, and resident of London, England, have invented certain new and useful Improvements in Pins, of which the following is a specification.

This invention relates to a novel construction or form of pin or fastening device which may be used to secure two portions of material, such as the adjacent edges of a garment, together.

The object of the invention is to provide a simple construction for a device of this nature which is adapted to many uses and which may be used in place of the ordinary buttons, hook-and-eye devices, etc.

In carrying out the invention, I provide a device comprising a body portion, which may be of any desired form, provided with one or more engaging portions extending therefrom and which are of peculiar construction and arrangement, which will be described more fully hereinafter.

As illustrating a preferred embodiment of my invention I have shown in the accompanying drawings a pin or fastening device constructed according to my invention.

In the drawings like parts in the several views have been given the same reference numerals.

Figure 2:
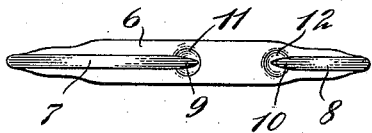

Figure 1 is a side elevation, partly in section, showing the construction of the body portion of the pin. Fig. 2 is a bottom plan view of Fig. 1.

The body portion 6 is provided with one or more recesses, such as 11 and 12, and the engaging portions 7 and 8, which extend inwardly from the opposite ends of the body portion 6, can be provided with pointed ends 9 and 10 which are positioned in the recesses 11 and 12, respectively. This protects the points of the engaging ends and prevents the same from catching in the material after being engaged therewith. The engaging portions 7 and 8 are of resilient construction. One of the engaging portions is longer than the other. The object of this is to provide for first engaging the long portion with one edge of the material and, on account of its greater length, the same is then prevented from becoming disengaged while the shorter portion is being engaged with the opposite edge of material. When the pin is engaged with both edges the tension or pull prevents the pin from becoming disengaged or unfastened.

It will thus be seen that I provide a simple form of device which is adapted to many uses and which may be made of any suitable material and provided with any desired ornamentation.

I do not wish to be understood as limiting the invention to the particular form or construction shown and described, as the same is intended as illustrative merely of one of the many possible constructions coming within the scope of the invention as defined in the accompanying claims.

What I claim is:—

1. A pin or fastening device of the class described comprising a body portion provided with recesses, pointed ends extending from said body portion into said recesses.

2. A pin or fastening device of the class described, comprising a body portion of spring material provided with pointed end portions formed integral therewith and extending inwardly and upwardly from the opposite ends of said body portion with the pointed ends thereof positioned adjacent the center of said body portion, said pointed end portions being normally in said position independently of any engagement with said body portion, and point protecting means on said body portion adjacent said pointed ends.

Signed in the city, county and State of New York, this 15th day of January, 1914.

STUART WEATHERLEY.

Witnesses:
LEWIS J. DOOLITTLE,
LOUELLA F. LITTLE.

Copies of this patent may be obtained for five cents each, by addressing the "Commissioner of Patents, Washington, D. C."